United States Patent [19]

Kuo et al.

[11] Patent Number: 6,061,767
[45] Date of Patent: May 9, 2000

[54] APPARATUS AND METHOD IN A NETWORK INTERFACE DEVICE FOR STORING STATUS INFORMATION CONTIGUOUS WITH A CORRESPONDING DATA FRAME IN A BUFFER MEMORY

[75] Inventors: Jerry Chun-Jen Kuo; Po-Shen Lai, both of San Jose; Autumn Jane Niu, Sunnyvale, all of Calif.

[73] Assignee: Advanced Micro Devices, Inc., Sunnyvale, Calif.

[21] Appl. No.: 08/993,531

[22] Filed: Dec. 18, 1997

[51] Int. Cl.[7] .................................................. G06F 12/00
[52] U.S. Cl. ..................... 711/156; 711/129; 711/153; 370/452
[58] Field of Search .................................. 711/156, 100, 711/129, 153; 710/100; 370/452

[56] References Cited

U.S. PATENT DOCUMENTS

| | | | |
|---|---|---|---|
| 4,914,652 | 4/1990 | Nguyen | 370/452 |
| 5,802,546 | 9/1998 | Chisholm et al. | 711/100 |
| 5,860,119 | 1/1999 | Dockser | 711/156 |

*Primary Examiner*—Tuan V. Thai
*Assistant Examiner*—Nasser Moazzami

[57] ABSTRACT

A network interface device having a random access memory for buffering data between a host bus interface and a media access controller includes a buffer controller configured for storing a data frame in combination with tracking and status information associated with the storage of the data frame. The memory controller is configured for writing receive frame data received from a media access controller into the random access memory. The tracking and status information is stored in memory locations contiguous with the data frame to enable a read controller operating in a separate clock domain to access the status information and the corresponding data frame as a single data unit. Moreover, the disclosed embodiment stores the status information at the beginning of the stored data unit, enabling a controller reading the buffer memory to immediately determine the status of the corresponding stored data frame.

7 Claims, 5 Drawing Sheets

APPARATUS AND METHOD IN A NETWORK INTERFACE DEVICE FOR STORING STATUS INFORMATION CONTIGUOUS WITH A CORRESPONDING DATA FRAME IN A BUFFER MEMORY

BACKGROUND OF THE INVENTION

1. Technical Field

The present invention relates to network interfacing and more particularly, to methods and systems for buffering data between a host bus interface and a media access controller accessing Ethernet media.

2. Background Art

Network interface devices handle packets of data for transmission between a host computer and a network communications system, such as a local area network. The host computer may be implemented as a client station, a server, or a switched hub. One primary function of the network interface device is to buffer data to compensate for timing discrepancies between the clock domain of the host computer and the clock domain of the network.

Network interface devices typically include a first in, first out (FIFO) buffer memory for storing transmit and receive data, where the transmit data is stored in a transmit FIFO prior to transmission on the network media by the MAC, and receive data is stored in a receive FIFO by the MAC prior to transfer to the host computer via the host computer bus interface.

One disadvantage with the use of a FIFO for a transmit buffer or a receive buffer is the increased latency encountered during the buffering process. The latency of the network interface device is the time delay between the time that a data frame is supplied to the network interface device and the time the data is transmitted on the network media, or vice versa.

An additional disadvantage with the use of a FIFO for a transmit buffer or receive buffer is the increased complexity associated with maintaining status information for each data frame stored in the FIFO buffer. If a stored data frame is to have corresponding status information, then an additional FIFO buffer may be required for storing the status information for each stored data frame. Hence, a transmit buffer may require a frame data FIFO for the actual frame data, and a status FIFO for storing the corresponding status information for each data frame. Such an arrangement would result in a substantial increase in the amount of area required on a chip for the status FIFO. In addition, additional synchronization logic would be required to maintain correspondence between the stored frame data and the corresponding status data.

DISCLOSURE OF THE INVENTION

There is a need for an arrangement that enables use of a random access memory in a network interface device, as opposed to a FIFO buffer, to store both a data frame and corresponding status information indicating the status of the stored frame.

There is also a need for an arrangement that enables storage of status information preceding the corresponding data frame in a random access memory, enabling a read controller to immediately determine whether to transfer the stored data frame or discard the stored data frame based on reading the corresponding status information preceding the stored data frame.

There is also a need for an arrangement in a network interface device for storing a data frame received by a media access controller into a random access memory, where the random access memory storing the receive data frame includes a header containing status information related to the network reception condition and the storage status of the stored data frame.

These and other needs are attained by the present invention, where a memory controller is configured for reserving at least one buffer memory location for status information associated with the reception of the data frame. The memory controller writes the receive data frame into contiguous buffer memory locations following the reserved buffer memory location, and writes the status information received from the media access controller into the reserved buffer memory location following writing the corresponding data frame into the random access memory.

According to one aspect of the present invention, a method in a network interface device for storing data associated with a data frame in a buffer memory, comprises reserving at least one buffer memory location of the buffer memory for status information corresponding to reception of the data frame by the network interface device, writing the data frame in contiguous buffer memory locations following the at least one buffer memory location, and Writing the status information generated during the reception of the data frame into the at least one buffer memory location following the data frame writing step. Reserving the first buffer memory location enables a network interface device to write the data frame in the contiguous buffer memory locations, and then update the first buffer memory location with the status information corresponding to reception of the data frame by the network interface device. Hence, the status information and corresponding data frame may be stored in contiguous memory locations, enabling a read controller accessing the buffer memory to quickly determine whether the corresponding data frame stores invalid data, requiring the read operation to be aborted or "flushed out."

Another aspect of the present invention provides a network interface device for storing a data frame. The network interface device includes a media access controller configured for receiving a data frame from a packet switched network, the media access controller generating status information associated with the reception of the data frame, a random access memory for storing the received data frame and the corresponding status information, and a memory controller configured for reserving at least one buffer memory location for the status information and for writing the data frame into contiguous buffer memory locations following the reserved at least one buffer memory location, the memory controller writing the status information into the reserved at least one buffer memory location following writing the corresponding data frame into the random access memory. Reserving the at least one buffer memory location for the status information enables the memory controller to first store the frame data received by the media access controller zenith minimal latency, followed by storing the status information received from the media access controller into the reserved buffer memory location. Hence, the memory controller enables generation of a header for the data frame that includes status information associated With reception of the data frame for use by read controllers and slave transfer routines optimized for reading header information prior to determining whether to transfer a stored data frame. Moreover, the reserving of the buffer memory location enables the memory controller to minimize processing delays by writing the frame data as it is received from the media access controller, without the necessity of any additional buffering.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 1, 1A and 1B are block diagrams illustrating an exemplary network interface device having a memory controller for writing a data frame and corresponding status information into a random access memory according to an embodiment of the present invention.

BEST MODE FOR CARRYING OUT THE INVENTION

The present invention will be described with the example of a network interface device in a packet switched network, such as an Ethernet (IEEE 802.3) network. A description will first be given of a network interface device architecture, followed by the arrangement for storing the data frame and the corresponding status information in the buffer memory. It will become apparent, however, that the present invention is also applicable to other network interface device systems.

NETWORK INTERFACE DEVICE ARCHITECTURE

Figure 1A:
Figure 1A:
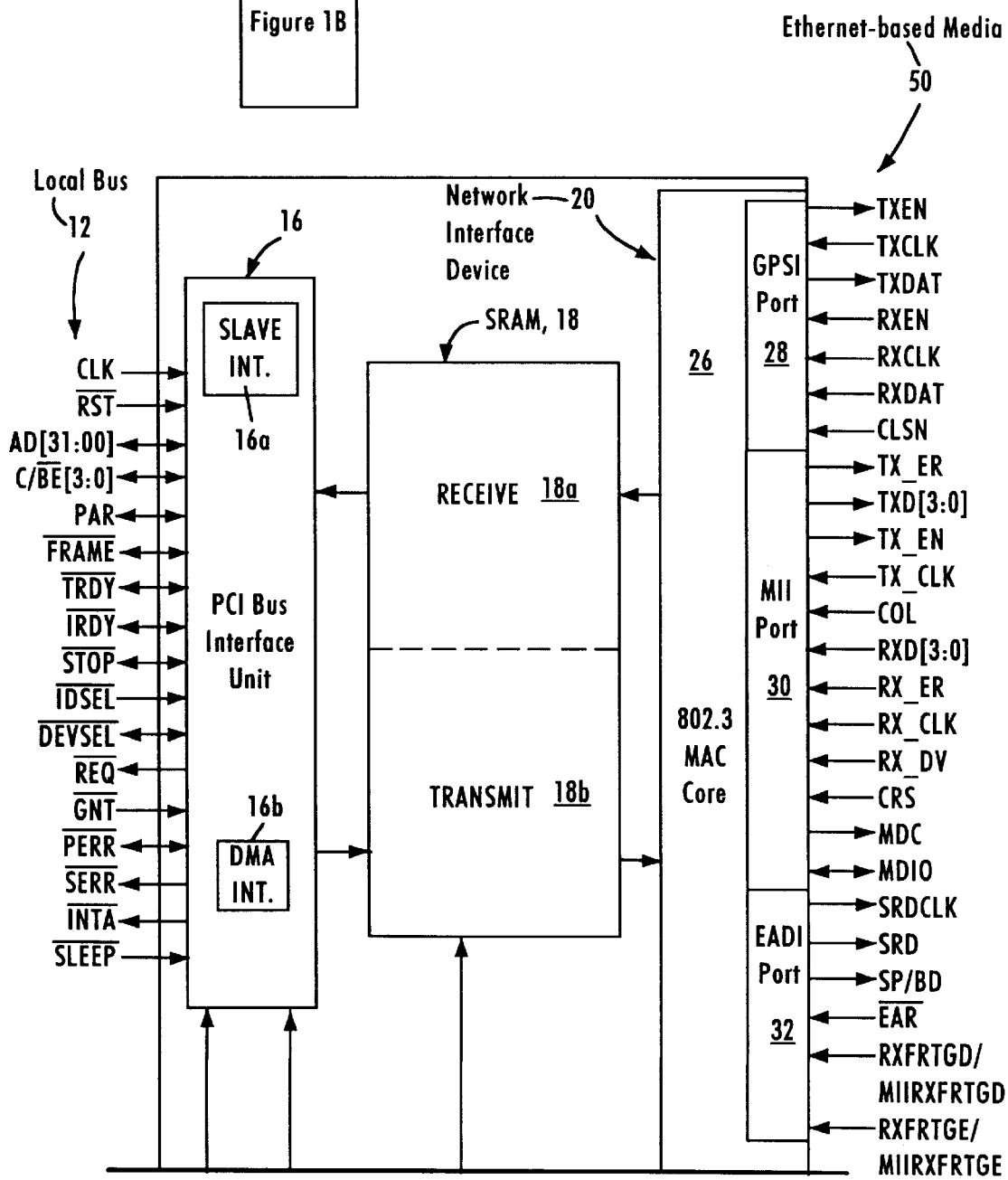
Figure 1B:
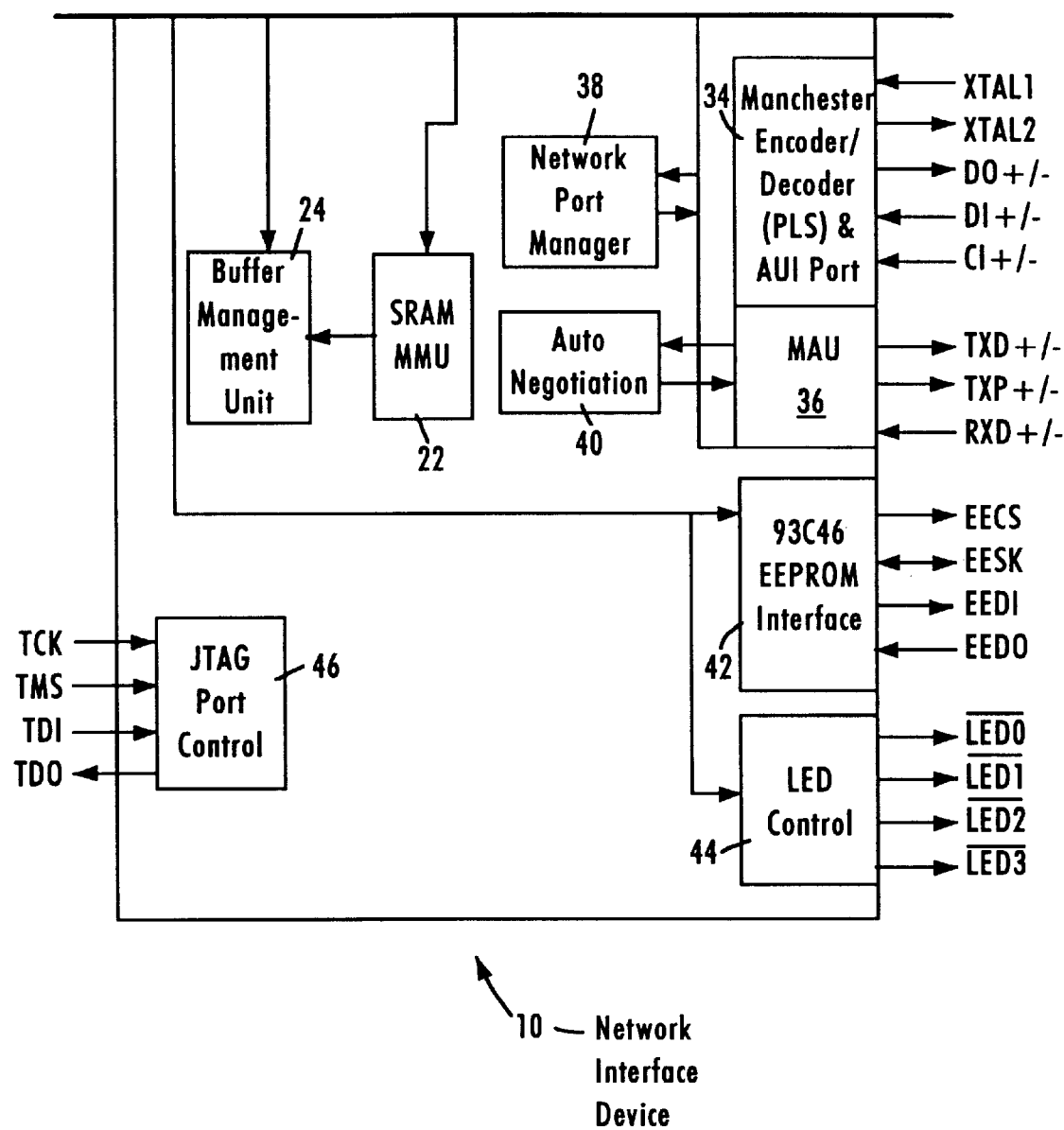

FIG. 1 is a block diagram of an exemplary network interface device 10 that accesses the media of an Ethernet (ANSI/IEEE 802.3) network according to an embodiment of the present invention.

The network interface device 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface device portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface device 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface device chip 10. According to the disclosed embodiment, the SRAM 18 may be accessed in a random access manner under the control of a memory management unit 22, or may be segmented into a receive portion 18a and a transmit portion 18b for receive and transmit paths, respectively.

The network interface device 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory management unit 22 are shown as discrete components, the two units may be integrated to form a memory management unit controlling all transfers of data to and from the memory unit 18.

The network interface device 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface device 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface device status registers (not shown). The network interface device 10 also includes an IEEE 1149.1-compliant JTAG boundary scan test access port interface 36.

The EEPROM interface 42 connects to an EEPROM on either a network interface device adapter card or the motherboard of the host computer via a serial interface link. The EEPROM (not shown in FIG. 1)) will be programmed with configuration information related to the network interface device, enabling the network interface device to be configured during initialization via the EEPROM interface 42. Once initialized, the network interface device stores the configuration information in internal registers (not shown), enabling the network interface device to operate independently of the host computer in the event the host computer is powered down. Hence, the network interface device can be configured to operate while the host computer is in a stand-by mode, enabling the network interface device to output power up information to logic within the host computer to enable the host computer to automatically turn on in response to data packets received from the network and having a specific protocol, described below.

MEMORY MANAGEMENT ARCHITECTURE

Figure 2:
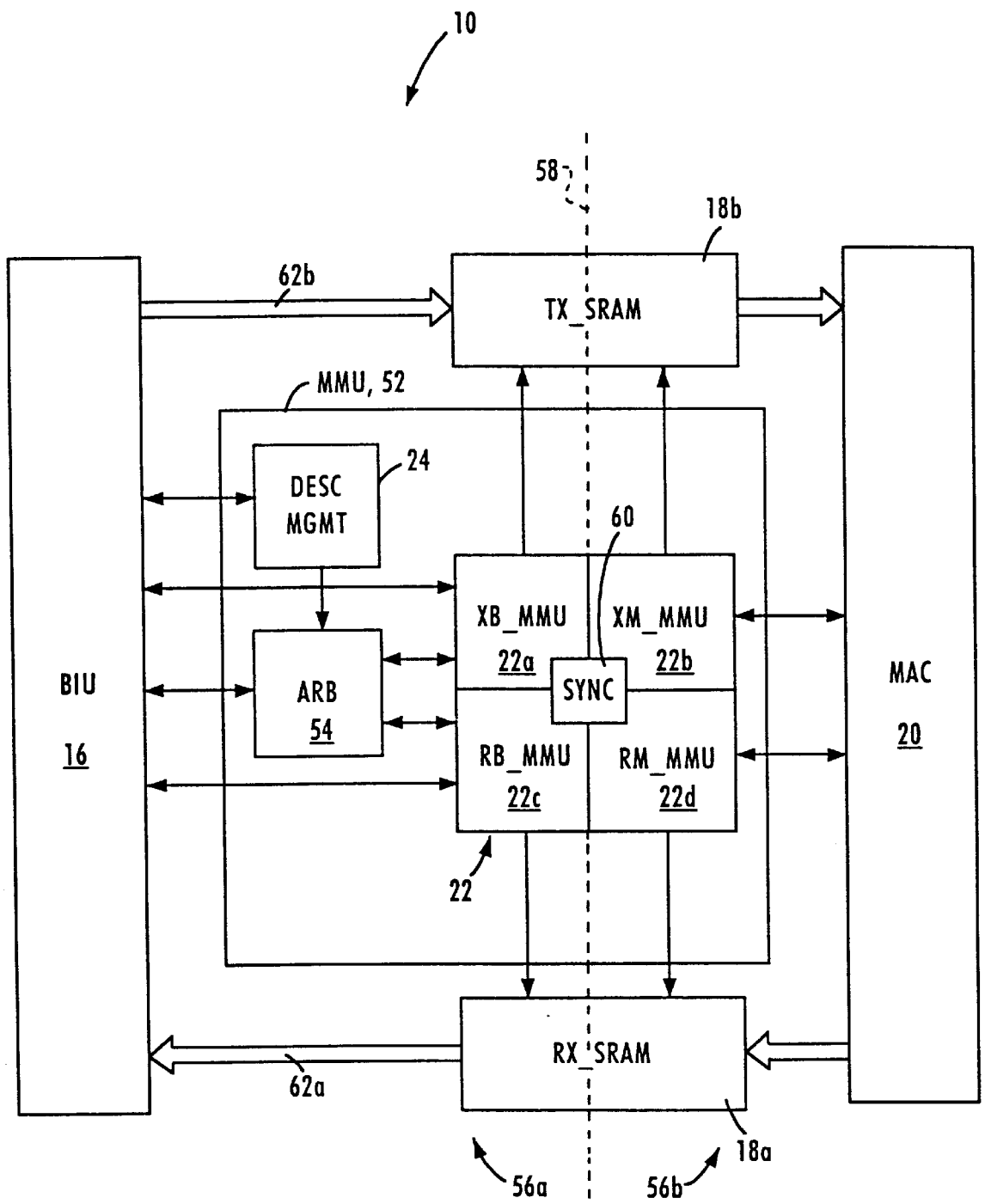
FIG. 2 is a block diagram illustrating in detail the buffer architecture of the network interface device of FIG. 1 according to an embodiment of the present invention.

FIG. 2 is a block diagram illustrating the buffer architecture of the network interface device 10 according to an embodiment of the present invention. As shown in FIG. 2, transfer of data frames between the PCI bus interface unit 16, also referred to as the bus interface unit (BIU), and the MAC 20 is controlled by a memory management unit (MMU) 52 including the buffer management unit 24 and the SRAM MMU 22 of FIG. 1. The MENU 52 controls the reading and writing of data to the SRAM 18, illustrated in FIG. 2 as a receive SRAM portion 18a and a transmit SRAM portion 18b for convenience. It will be recognized in the art that the receive SRAM (RX_SRAM) 18a and the transmit SRAM (TX_SRAM) 18b may be implemented as a single memory device, or alternatively as two separate SRAM devices.

As shown in FIG. 2, the memory management unit includes the buffer management unit 24, also referred to as the descriptor management unit, the SRAM MMU 22, and an arbitration unit 54. The arbitration unit 54 arbitrates DMA requests for data transmission, data reception, descriptor lists from the descriptor management block 24, and status.

The SRAM MMU 22 includes separate controllers for each SRAM 18a and 18b, for both read and write operations. According to the disclosed embodiment, the network interface device 10 operates in two generic clock domains, namely a host computer bus clock domain 56a, and a network clock domain 56b. Since the network interface device 10 needs to send and receive data across two independent clock domains 56, divided by the dotted line 58, the its SRAM MMU 22 needs to be able to write and read data to each SRAM 18a and 18b in a manner that tracks memory status independent of the PCI clock in the host computer domain and the MAC clock generated from network activity in the network domain 56b.

According to the disclosed embodiment, the SRAM MMU includes a transmit-data bus-side memory management unit (XB_MMU) 22a, a transmit-data MAC-side memory management unit (XM_MMU) 22b, a receive-data bus-side memory management unit (RB_MMU) 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a, respectively. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transmit data to be output onto the network by the MAC 20 is written into the TX_SRAM 18b via data path 62b under the control of the transmit-data write controller 22a, configured for writing the frame data synchronized to the PCI bus clock (CLK). The stored transmit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

Figure 3:
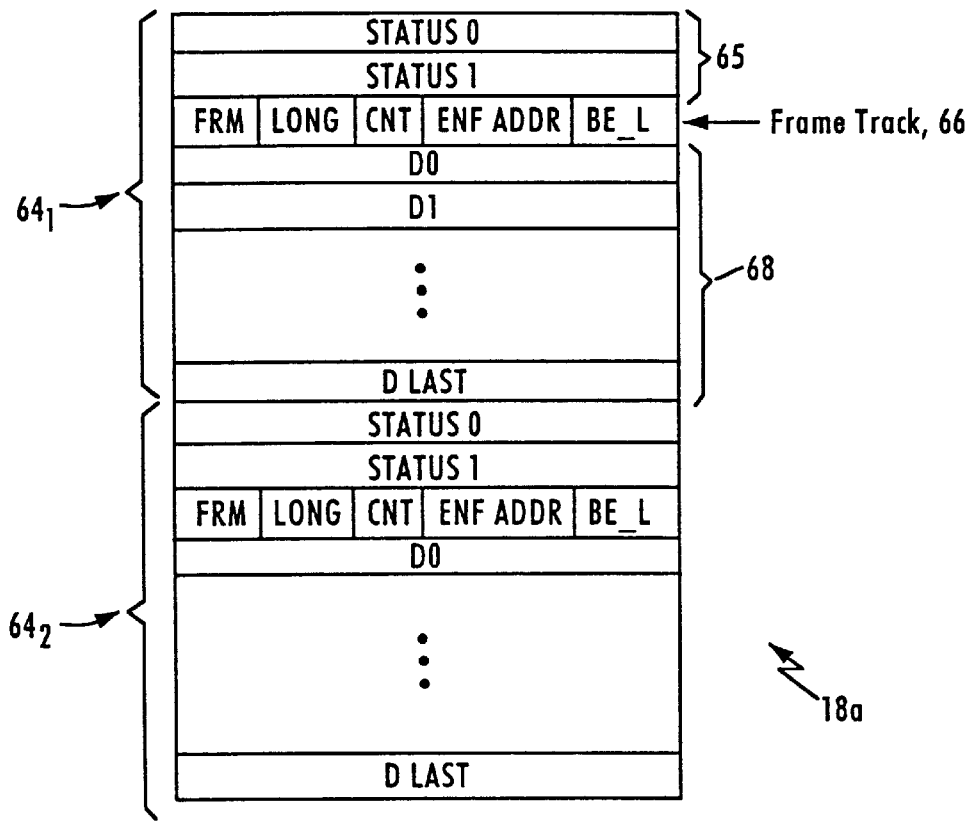
FIG. 3 is a diagram illustrating an exemplary data structure of a received data frame stored in the receive buffer of FIG. 2.

FIG. 3 is a diagram illustrating the data structure of a data unit 64 in the RX_SRAM 18a. As shown in FIG. 3, each stored data unit $64_i$ includes two buffer memory locations for storing status information 65, followed by a frame track field 66 in the next contiguous memory location, and the stored data frame 68 output from the MAC 20 and written into contiguous buffer memory locations following the status information 65 and the frame track field 66. Specifically, the storage data frame 68 is stored in 32-bit wide double word format memory locations in a contiguous sequence (D0, D1, . . . DLAST).

As described below, each data unit 64 is written by first reserving the contiguous buffer memory locations for the double word Status 0, Status 1 (together forming the status information 65), and the frame track 66 by writing null values into the first three contiguous memory locations. The memory controller (RM_MMU) 22d then writes the frame data in 32-bit wide double word format into the contiguous buffer memory locations 68 following the corresponding locations for the status information 65 and the frame track field 66. The memory controller 22d continues to write the 32-bit wide frame data fields in the contiguous locations D0, D1, etc. until reception of an end of frame (RM_ENF) signal from the MAC 20. In response to the end of frame (RM_ENF) signal, the memory controller (RM_MMU) 22d jumps to the first buffer memory location (status 0), receives the status information from the media access controller, and writes the first and second portions of the status information 65 into the first and second buffer memory locations (status 0 and status 1), respectively. The memory controller 22d then updates the frame track field 66, then jumps to reserve the next contiguous memory locations for the status information 65 and frame track field 66 for the next received data frame (e.g., $64_2$).

Figure 4:
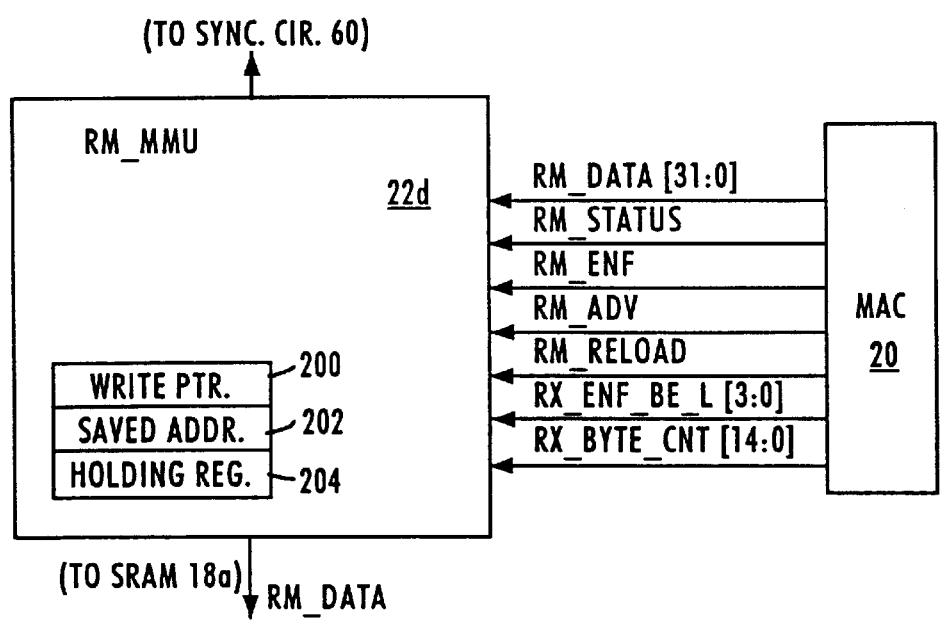
FIG. 4 is a block diagram illustrating in detail the receive MAC memory management unit of FIG. 2.

FIG. 4 is a block diagram illustrating the signals passed between the MAC 20 and the RM_MMU 22d in writing the status information 65, the frame track field 66 and the frame data 68 for each data unit 64 in the receive SRAM 18a. According to the disclosed embodiment, the MAC 20 generates the information associated with the status field 65 and the frame track field 66. Specifically, the MAC 20 outputs a 32 bit received MAC data bus (RM_DATA) that transfers received data from the MAC 20 to RM_MMU 22d. As described below, the MAC 20 outputs both frame data and the status data 65 on the RM_DATA bus. The MAC 20 also outputs an RM_STATUS signal indicating that the data on the RM_DATA bus is status information for the status field 65. The MAC 20 also outputs a RM_ENF signal indicating end of the received frame. The MAC also outputs an RM_ADV signal used to advance a write pointer 200 in the RM_MMU 22d for the RX_SRAM 18a. The RM_RELOAD signal causes the RM_MMU 22d to reload the received SRAM write pointer with the save write pointer in register 202, and is used to discard frames that are smaller than 64 bytes. The RM_MMU 22d also includes a holding register 204 for temporarily storing generated frame track values prior to storage in the frame track field 66, described below.

The MAC 20 also outputs a byte count value (RX_BYTE_CNT), and a byte enable (RX_ENF_BE_L) that specifies the number of valid bytes in the last data DWORD stored in the DLAST memory location.

Figure 5:
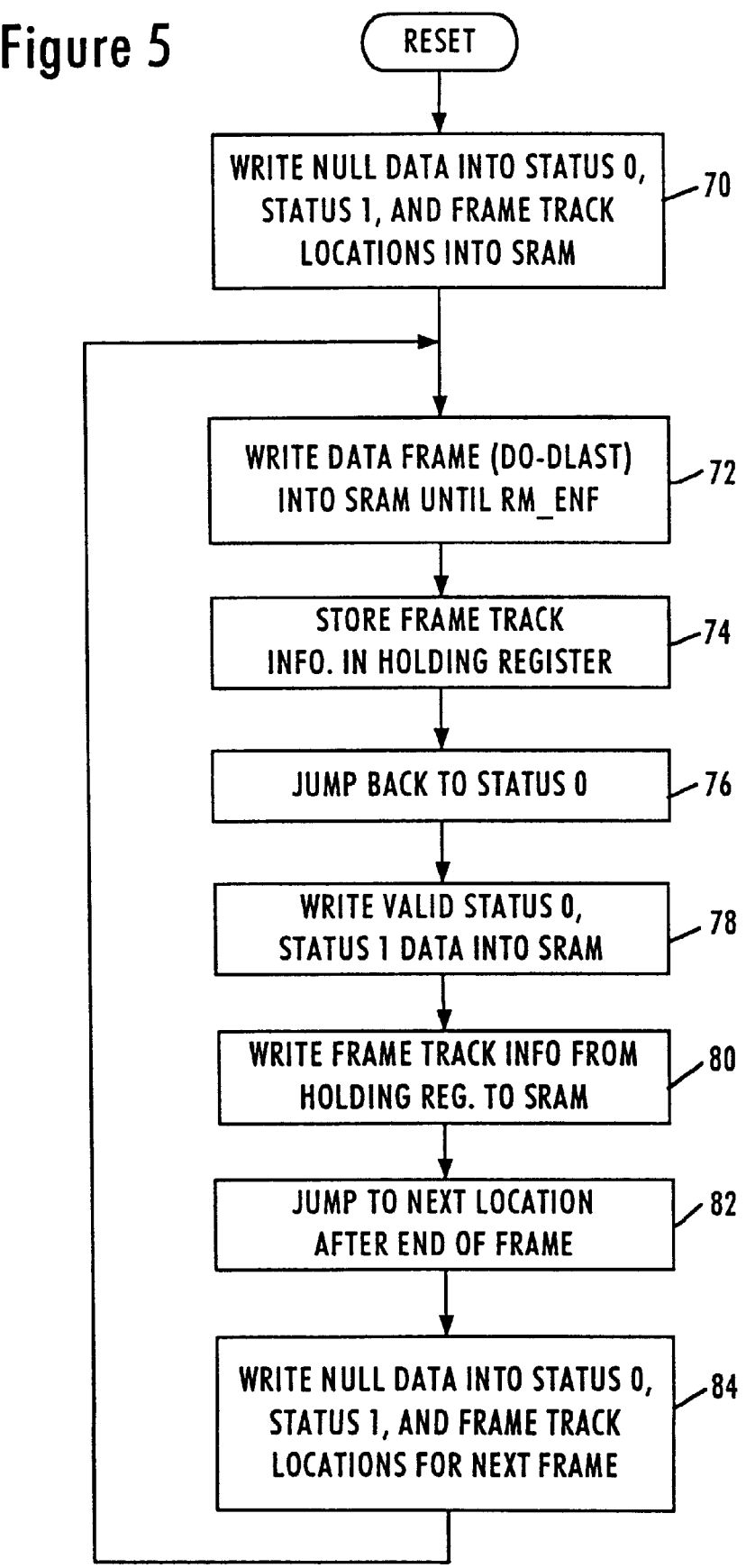
FIG. 5 is a flow diagram illustrating the method for storing frame data and corresponding status information into the receive buffer according to an embodiment of the present invention.

FIG. 5 is a flow diagram illustrating the method for writing the data unit 64 including the status information 65 and the frame track field 66, followed by the data frame 68 in contiguous buffer memory locations according to an embodiment of the present invention. The RM_MMU 22d begins after reset by reserving the first three buffer memory locations for the status information 65 and the frame track field 66 by writing null data into the first three contiguous memory locations (step 70). Writing null data into the first three contiguous memory locations advances the write pointer 200 to point to the next contiguous location (D0) for storage of frame data received from the MAC 20 via the RM_DATA bus. The RM_MMU 22d then waits for a data frame from the MAC 20, and writes the data frame into contiguous buffer memory locations (D0, D1, . . . ) in step 72, and increments the write pointer 200 after the writing of each DWORD into the memory 18a. The RM_MMU 22d continues to write frame data until reception of an end of frame signal (RM_ENF) from the MAC 20, indicating a completed transfer of the data frame 68 into the buffer memory 18a In response to receiving the RM_ENF signal, the RM_MMU 22d stores the write pointer value from the write pointer 200 specifying the last contiguous buffer memory location storing the data frame (e.g., DLAST) in the ENF ADDR field of the holding register 204 in step 74. The RM_MMU 22d also stores in the holding register 204 in step 74 the byte count (CNT) field from the RX_BYTE_CNT path from the MAC 20, and the byte enable (BE_L) field from the RX_ENF_BE_L signal path from the MAC 20. The RM_MMU 22d also sets the frame bit field in the internal holding register 204 to 1 to indicate valid frame data once written into the frame track field 66 of the SRAM 18a.

Following storage of the frame track information (e.g., FRM, LONG, CNT, ENF ADDR, BE_L) in the holding register 204, the RM_MMU 22d jumps back to the first buffer memory location (status 0) in response to the end of frame (RM_ENF) signal in step 76. The RM_MMU 22d in step 78 receives the status information from the MAC 20 across the receive data bus (RM_DATA) and writes the first and second portions of the status information 65 into the first and second reserved buffer memory locations (Status 0 and Status 1), respectively. The RM_MMU 22d then writes the obtained tracking information from the holding register 204 to the third reserved buffer memory location (frame track 66) in step 80.

After updating the status field 65 and the frame track field 66 with valid data, the RM_MMU 22d jumps to the next contiguous location after the end of the written data unit 64, in step 82, i.e., the Status 0 location for the next frame $64_2$. The RM_MMU 22d then writes null data in step 84 into the Status 0, Status 1, and frame track fields for the next frame $64_2$ to prepare for reception of the next data frame.

According to the disclosed embodiment, status information and frame track information are stored in contiguous memory locations preceding a corresponding frame memory, enabling storage of both frame data and corresponding status information in a single buffer memory. Moreover, multiple received frames may be temporarily stored in the receive buffer 18a using a minimal amount of buffering, without the necessity of a separate status buffer.

Storage of the status information and the frame track information preceding the corresponding data frame enables a read controller (such as the RB_MMU 22c) or a host performing a slave transfer, to access the received frame status before actual retrieval of the received frame data In addition, rapid and efficient data transfers can be performed from the SRAM 18a by a host operating the network interface device in slave mode, since determination of whether to read a stored data frame or "flush" the frame can be quickly determined by reading the status and the frame track fields, and then merely incrementing a read pointer to begin retrieval of the stored frame data 68.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network interface device for storing data associated with a data frame in a buffer memory comprising:
reserving contiguous buffer memory location of the buffer memory for status information corresponding to reception of the data frame by the network interface device;
writing the data frame in contiguous buffer memory locations following the reserved contiguous buffer memory locations; and
writing the status information generated during the reception of the data frame into the reserved continuous buffer memory locations following the data frame writing step,
the reserving step including
reserving a first buffer memory locations for a first portion of the status information,
reserving a second buffer memory location contiguous with and following the first buffer memory location for a second portion of the status information, and
reserving a third buffer memory location contiguous with and following the second buffer memory location for tracking information specifying conditions of the stored data frame,
the data frame writing step including
receiving the data frame as a plurality of data words from a media access controller across a receive data bus, and
storing the data words in the respective continuous buffer memory locations, and
the status information writing step including
receiving an end of frame signal from the media access controller indicating completed transfer of the data frame from the media access controller to the buffer memory,
jumping to the first buffer memory location in response to the end of frame signal,
receiving the status information from the media access controller across the receive data bus, and
writing the first and second portions of the status information into the first and second buffer memory locations, respectively.

2. A method in a network interface device for storing data associated with a data frame in a buffer memory comprising:

reserving contiguous buffer memory location of the buffer memory for status information corresponding to reception of the data frame by the network interface device;

writing the data frame in contiguous buffer memory locations following the reserved contiguous buffer memory locations; and writing the status information Generated during the reception of the data frame into the reserved contiguous buffer memory locations following the data frame writing step, the reserving step including
reserving a first buffer memory location for a first portion of the status information,
reserving a second buffer memory location contiguous with and following the first buffer memory location for a second portion of the status information, and
reserving a third buffer memory location contiguous with and following the second buffer memory location for tracking information specifying conditions of the stored data frame, the data frame writing step including
receiving the data frame as a plurality of data words from a media access controller across a receive data bus, and
storing the data words in the respective contiguous buffer memory locations, and the status information writing step including
receiving an end of frame signal from the media access controller indicating completed transfer of the data frame from the media access controller to the buffer memory,
obtaining tracking information in response to the end of frame signal,
jumping to the first buffer memory location in response to the end of frame signal and after the tracking information obtaining step,
receiving the status information from the media access controller across the receive data bus, and
writing the first and second portions of the status information into the first and second buffer memory locations, respectively.

3. The method of claim 2, wherein the tracking information obtaining step comprises:

storing in a holding register a write pointer value specifying a last of the contiguous buffer memory locations storing the data frame; and storing in the holding register a byte count and a byte enable each received from the media access controller, the byte count specifying a number of bytes in the stored data frame, and the byte enable specifying valid bytes in the last of the contiguous buffer memory locations storing the data frame.

4. The method of claim 3, wherein the status information writing step further comprises writing the obtained tracking information from the holding register to the third buffer memory location following the step of writing the first and second portions of the status information.

5. A network interface device for storing a data frame, comprising:

a media access controller configured for receiving a data frame from a packet switched network, the media access controller generating status information associated with the reception of the data frame;

a random access memory for storing the received data flame and the corresponding status information; and a memory controller receiving the data frame and the corresponding status information, and configured for
reserving first and second contiguous buffer memory locations for the status information, and a third contiguous buffer memory location for tracking information associated with storage of the data frame,
writing the data frame into contiguous buffer memory locations following the reserved first, second and third contiguous buffer memory locations,
obtaining tracking information in response to an end of frame signal from the media access controller and storing in a holding register,
jumping to the reserved first contiguous buffer memory location in response to the end of frame signal after the tracking information is obtained,
receiving the status information from the media access controller across a receive data bus,
writing the status information into the reserved first and second contiguous buffer memory locations following writing the corresponding data frame into the random access memory, and
writing the obtained tracking information from the holding register to the reserved third contiguous buffer memory location following writing the status information into the reserved first and second contiguous buffer memory locations.

6. The network interface device of claim 5, wherein the memory controller further comprises:

a write pointer for identifying a selected one of the buffer memory locations for writing data, wherein the tracking information stored in the holding register and written to the reserved third contiguous buffer memory location includes the write pointer value identifying a last of the contiguous buffer memory locations storing the received data frame.

7. The network interface device of claim 6, wherein the the tracking information in the holding register and written to the reserved third contiguous buffer memory location further includes a byte count and a byte enable, each received from the media access controller, in response to the end of frame signal.

* * * * *